(12) United States Patent
Monia et al.

(10) Patent No.: US 6,708,242 B1
(45) Date of Patent: Mar. 16, 2004

(54) METHODS FOR ADDRESSING EXTENDED NUMBER OF PERIPHERAL DEVICES OVER PERIPHERAL BUS

(75) Inventors: Charles A. Monia, San Jose, CA (US); Lawrence J. Lamers, San Jose, CA (US); Ebrahim Hashemi, Los Gatos, CA (US); Andrew J. Roy, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 376 days.

(21) Appl. No.: 09/636,038

(22) Filed: Aug. 9, 2000

Related U.S. Application Data

(60) Provisional application No. 60/153,387, filed on Sep. 10, 1999.

(51) Int. Cl.[7] .................... G06F 13/00; G06F 13/368; G06F 3/00
(52) U.S. Cl. ................... 710/300; 710/119; 710/9
(58) Field of Search .................. 710/11, 240, 244, 710/300

(56) References Cited

U.S. PATENT DOCUMENTS

| | | | | |
|---|---|---|---|---|
| 5,274,783 A | * | 12/1993 | House et al. | 710/300 |
| 5,596,727 A | * | 1/1997 | Literati et al. | 710/300 |
| 5,802,327 A | * | 9/1998 | Hawley et al. | 710/300 |
| 5,987,558 A | * | 11/1999 | Monia et al. | 710/240 |
| 6,058,436 A | * | 5/2000 | Kosco | 710/11 |
| 6,101,570 A | * | 8/2000 | Neumyer | 710/240 |
| 6,185,651 B1 | * | 2/2001 | Monia et al. | 710/240 |
| 6,223,244 B1 | * | 4/2001 | Downer et al. | 710/244 |

* cited by examiner

Primary Examiner—Glenn A. Auve
Assistant Examiner—Christopher E. Lee
(74) Attorney, Agent, or Firm—Martine & Penilla, LLP

(57) ABSTRACT

The present invention provides methods for addressing an extended number of peripheral devices over a bus. A bus having an N-bit datapath is provided in a computer system. An extended address space is defined for a set of extended peripheral devices by assigning a bus ID to each extended peripheral device. Each bus ID includes a group ID and a group member ID. Each group ID and group member ID also indicates a priority of said associated device. One or more peripheral devices arbitrate for the bus. In this process, a peripheral device having the highest priority group ID and the highest priority group member ID among the arbitrating devices wins the arbitration. After arbitration, the winning device selects, for transferring data, a device by placing on the bus the bus IDs of the selecting and selected devices.

20 Claims, 13 Drawing Sheets

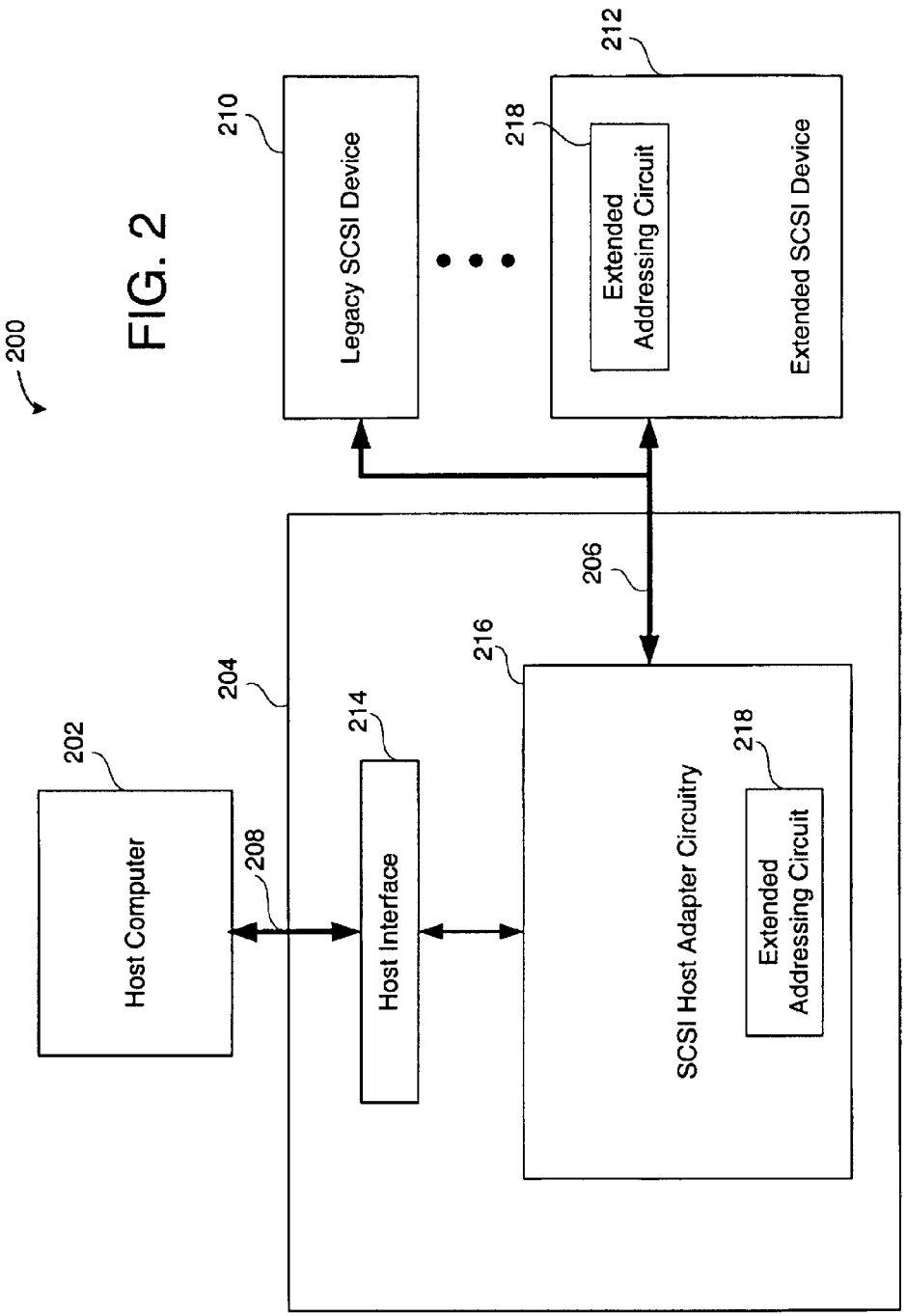

METHODS FOR ADDRESSING EXTENDED NUMBER OF PERIPHERAL DEVICES OVER PERIPHERAL BUS

CROSS REFERENCE TO RELATED APPLICATION

The present application claims benefit of U.S. Provisional Patent Application No. 60/153,387, entitled "Methods for Addressing Extended Number of Peripheral Devices over Peripheral Bus," by Charles A. Monia et al., filed on Sep. 10, 1999. This application is incorporated herein by reference.

BACKGROUND OF THE INVENTION

1. Field of the Invention

This invention relates generally to computer systems having a peripheral bus, and more particularly to methods for extending the number of devices that can be connected to a computer system via a peripheral bus.

2. Description of the Related Art

Modern computer systems often utilize one or more buses to connect to peripheral devices to enhance its resources. For example, the resources of a computer system may be substantially increased by connecting the computer system to one or more peripheral devices such as disk drives, tape drives, printers, scanners, optical drives, and the like. These peripheral devices are attached to the computer system by means of a peripheral bus (e.g., cable).

One of the most widely used peripheral buses is the well known small computer systems interface (SCSI) bus, which is defined in conformity with well known SCSI protocols (e.g., SCSI-1, SCSI-2, SCSI-3, etc.), which are incorporated herein by reference. The SCSI protocols are designed to provide an efficient peer-to-peer I/O interface between a host computer and its peripheral devices in a computer system.

FIG. 1 illustrates a block diagram of an exemplary computer system 100 having a host computer 102, an SCSI host adapter 104, a plurality of SCSI devices 106, and an SCSI bus 108. The SCSI host adapter 104 is coupled between the host computer 102 and the SCSI devices 106. Specifically, the host computer 102 is coupled to the SCSI host adapter 104 by means of a host bus 110 such as a PCI bus or the like. On the other hand, the SCSI devices 106 are coupled to the host adapter 104 by means of the SCSI bus 108. Under the conventional SCSI specifications, the SCSI bus 108 may connect up to 15 SCSI devices 106 to the host adapter 104 depending on the type of SCSI bus implemented. Since the SCSI host adapter 104 is, in reality, an SCSI device, up to 16 SCSI devices may be connected to the host computer 102. The SCSI devices 106 may be devices such as disk drives, tape drives, printers, scanners, optical drives, or any other devices that meet the SCSI specification.

The host adapter 104 in the computer system 100 controls communication between the host computer 102 and the SCSI devices 106 and includes a host interface 112 and SCSI adapter circuitry 114. The host interface 112 is configured to provide a physical connection between the host bus 110 and the SCSI adapter circuitry 114. The SCSI host adapter circuitry 114, on the other hand, is configured to receive data, address, and control signals from the host computer 102 via the host bus 110 and convert the signals into corresponding SCSI compatible data, address, and control signals. Conversely, the SCSI host adapter circuitry 114 is also configured to receive SCSI compatible data, address, and control signals from the SCSI devices 106 through the SCSI bus 108 and convert them into corresponding host-bus compatible data, addressing, and control signals. The SCSI host adapter chip 104 is well known in the art and may be implemented, for example, by using AIC-7890A™ packaged semiconductor device, which is available from Adaptec Inc., of Milpitas, Calif.

Currently, the SCSI bus 108 is generally implemented as a cable having a set of parallel wires. For example, the SCSI-1 cable has 50 wires. Of these 50 wires, eight wires are for data, one wire is for parity, nine wires are for control, 25 wires are for ground, and the remaining wires are for power or are reserved for future use. The eight data wires are used to carry eight bits of data in parallel. In general, conventional SCSI bus cables include either eight or 16 data wires for carrying eight or 16 bits, respectively, of data in parallel. The data wires in the bus thus define a datapath for communicating bits equal to the number of data wires in the bus.

A traditional SCSI bus may accommodate a plurality of SCSI devices up to a maximum number equal to the number of data bits in the SCSI bus. In practice, the width of the SCSI datapath is typically 8 or 16 bits corresponding to the number of data wires in the SCSI bus. This means the maximum number of SCSI devices, including a host adapter, that can be attached to a host computer is 8 or 16.

In recent years, however, the SCSI bus technology has evolved to a point where it is now capable of handling more data throughput than the connected SCSI devices, even at the maximum number of devices allowed for the bus, can generally utilize. For example, a recent SCSI standard commonly known as "SCSI Parallel Interface-3" (SPI-3), which is incorporated herein by reference, allows data transfer of 80 Megabytes per second (MB/sec) or 160 MB/sec on a wide bus.

Unfortunately, using such a high bandwidth bus for only the prescribed maximum number of peripheral devices results in under-utilization of the valuable bus resources. This is because the newer SCSI buses typically have sufficient bandwidth to accommodate more than the maximum prescribed number of devices, which is currently 16. At such high data transfer rates, the SCSI bus may not be utilized to its full capacity due to the limitation in the maximum number of devices that can be attached to the bus.

In view of the foregoing, what is needed is a method for extending the number of devices that can be connected to an SCSI bus and addressed efficiently so as to more fully utilize the increased data throughput capacity of the SCSI bus.

SUMMARY OF THE INVENTION

The present invention fills these needs by providing methods for addressing an extended number of peripheral devices over a peripheral bus. It should be appreciated that the present invention can be implemented in numerous ways, including as a process, an apparatus, a system, a device, a method, or a computer readable medium. Several inventive embodiments of the present invention are described below.

In one embodiment, the present invention provides a method for addressing an extended number of peripheral devices over a bus. In this method, a bus having an N-bit datapath is provided in a computer system. An extended address space is defined for a set of extended peripheral devices by assigning a bus ID to each extended peripheral device. Each bus ID includes a group ID and a group member ID. Each group ID and group member ID also indicates a priority of the associated device. One or more peripheral devices arbitrate for the bus. In this process, a peripheral device having the highest priority group ID and the highest priority group member ID among the arbitrating devices wins the arbitration. After arbitration, the winning device selects, for transferring data, a device by placing on the bus the bus IDs of the selecting and selected devices. Preferably, the bus is an SCSI bus and the devices are SCSI devices. In another embodiment, the arbitration process is implemented in accordance with quick arbitration as defined by SPI-3.

In another embodiment, the present invention provides a method for addressing more than N peripheral devices that are coupled to a host computer system via a bus. The bus includes an N-bit datapath. The method includes: (a) defining an extended address space for (N/2)-by-(N/2) peripheral devices by assigning a bus ID to each peripheral device with each bus ID being associated with a first ID and a second ID, wherein each of the first and second IDs indicate a priority of the associated device; (b) arbitrating, by one or more peripheral devices, for the bus wherein a peripheral device having a highest priority first ID and a highest priority second ID wins the arbitration; (c) selecting, by the winning device, a target device by placing on the bus the bus IDs including the first IDs and the second IDs of the winning and target devices, the winning device selecting the target device for transferring data; and (d) when the data transfer has not been completed, repeating operations (b) to (c), wherein the target device arbitrates for the bus and reselects the winning device for completing the data transfer.

In yet another embodiment, a method is provided for addressing a plurality of SCSI devices over an SCSI bus having an N-bit datapath. In this method, an SCSI ID is assigned to each peripheral device with each SCSI ID being defined by partitioning the N-bit datapath into a first ID field and a second ID field. The first ID field defines a first ID and the second ID field defines a second ID, wherein each of the first and second IDs indicate a priority of an associated device. Peripheral devices needing access to the bus arbitrate for the bus. In the arbitration process, a peripheral device having a highest priority first ID and a highest priority second ID wins the arbitration as an initiator. After the arbitration process, the initiator selects a target device for transferring data therebetween by placing on the bus the SCSI IDs of the initiator and the target device. The operations of arbitrating and selecting are repeated if the data transfer has not been completed with the target device arbitrating for the bus and reselecting the initiator to complete the data transfer.

Advantageously, the methods of the present invention allow more than the conventional number of peripheral devices to be coupled to a computer system. In particular, the partitioning of the N-bit datapath of the bus to provide group and group member IDs allows substantially more devices to be accommodated on the bus. For example, partitioning of a 16-bit datapath into an 8-bit group ID and an 8-bit group member ID effectively allows 8-by-8 or 64 devices to be addressed on the bus. In addition, the methods of the present invention may be used in quick arbitration and fairness arbitration to enhance speed and maintain fairness in the arbitration process. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2 illustrates a block diagram of an exemplary computer system in which the present invention may be implemented in accordance with one embodiment of the present invention.

DETAILED DESCRIPTION OF THE PREFERRED EMBODIMENTS

Figure 1:
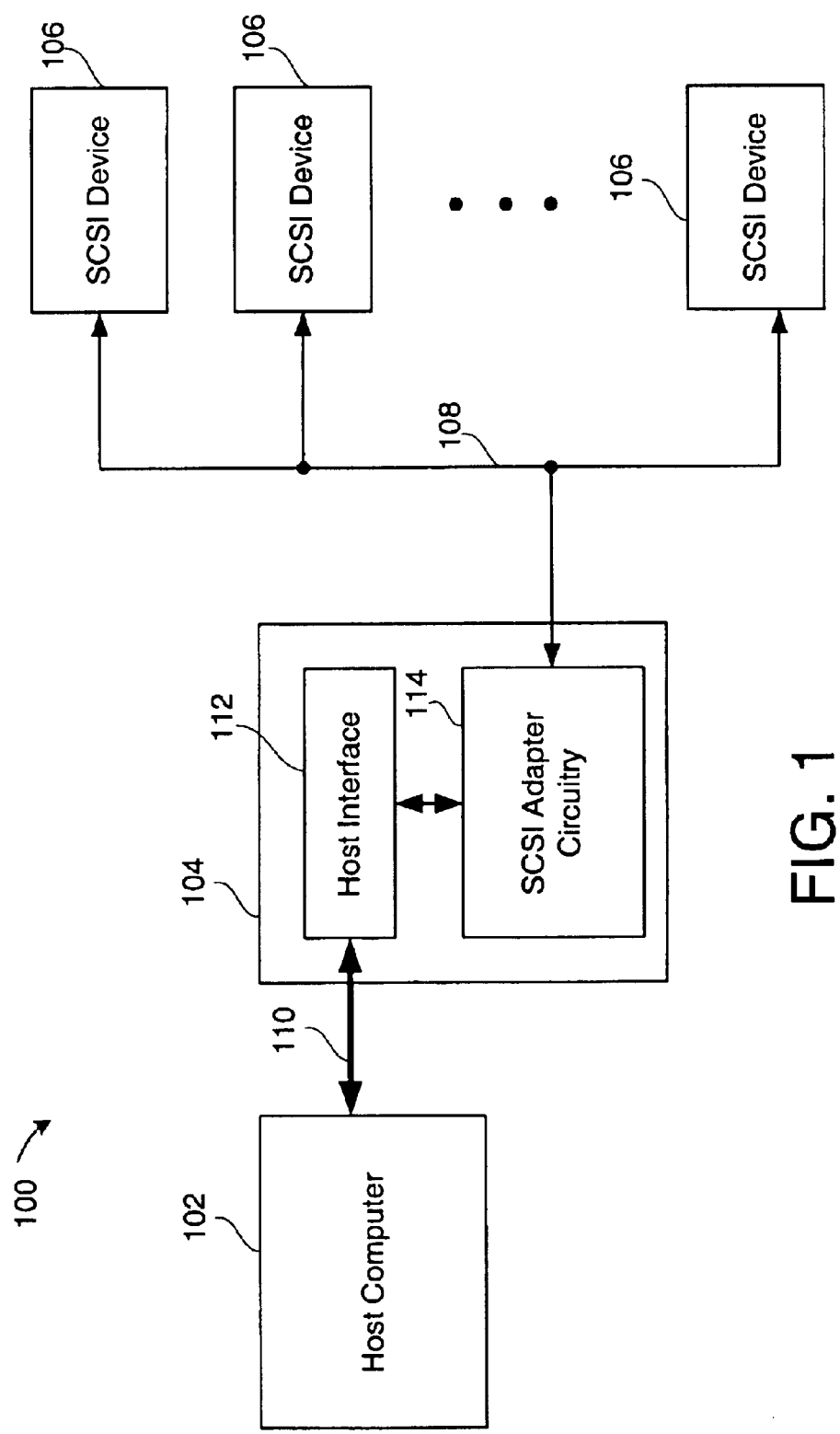
FIG. 1 illustrates a block diagram of an exemplary computer system having a host computer, an SCSI host adapter, a plurality of SCSI devices, and an SCSI bus.

The present invention provides methods for addressing an extended number of peripheral devices over a bus in a computer system. It will be obvious, however, to one skilled in the art, that the present invention may be practiced without some or all of these specific details. In other instances, well known process operations have not been described in detail in order not to unnecessarily obscure the present invention.

The methods of the present invention are implemented in a computer system that includes a plurality of peripheral devices coupled to the bus having an N-bit datapath. An extended address space is defined for a set of extended peripheral devices by assigning a bus ID to each extended peripheral device. Each bus ID is associated with a group ID and a group member ID. Each group IDs and group member IDs also indicates a priority of said associated device. One or more peripheral devices arbitrate for the bus. In this process, a peripheral device having a highest priority group ID and a highest priority group member ID wins the arbitration. After winning the arbitration, the device selects another device for transferring data by placing on the bus the bus IDs of the selecting device and the device to be selected. In a preferred embodiment, the bus is an SCSI bus and the peripheral devices are SCSI devices.

FIG. 2 illustrates a block diagram of an exemplary computer system 200 in which the present invention may be implemented in accordance with one embodiment of the present invention. The computer system 200 includes a host computer 202, an SCSI host adapter 204, a host bus 208, an SCSI bus 206, and optional legacy peripheral SCSI devices 210, and one or more extended SCSI devices 212. As used herein, legacy SCSI devices refer to conventional SCSI devices that do not support the extended addressing scheme of the present invention while extended SCSI devices refer to devices that support the extended addressing as described in more detail below. Although the present invention is implemented in conjunction with an SCSI bus and devices, it may also be utilized in any suitable peripheral buses and bus devices. In addition, the computer system 200 may accommodate any suitable number of peripheral devices in accordance with the type of SCSI bus and extended addressing method of the present invention.

The host adapter 204 includes a host interface 214 and an SCSI host adapter circuitry 216. The host interface 214 provides an interface function between the SCSI host adapter circuitry 216 and the host computer 202 through the host bus 208 (e.g., PCI bus). The host adapter circuitry 216 is coupled to the SCSI devices 210 and 212 by means of the SCSI bus 206 and is adapted to control communication between the host computer 202 and the SCSI devices 210 and 212. The SCSI host adapter circuitry 216 and each of the extended SCSI devices 212 include an extended addressing circuit 218 for implementing the extended addressing features in accordance with one embodiment of the present invention.

Figure 3A:
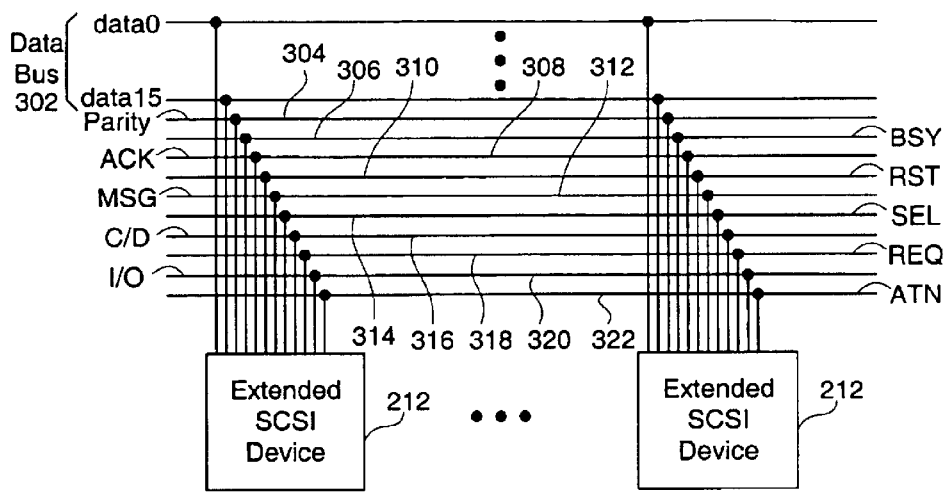
FIG. 3A illustrates a more detailed block diagram of the SCSI bus that is used to connect the SCSI devices including the host adapter in accordance with one embodiment of the present invention.

FIG. 3A illustrates a more detailed block diagram of the SCSI bus 206 that is used to connect the SCSI devices 210 and 212 including the host adapter 204 in accordance with one embodiment of the present invention. The SCSI bus 206 includes a set of electrical lines (e.g., wires) for carrying data and control signals. In this illustrated embodiment, a set of data lines 302 comprising data 0 to data 15 defines a datapath used for carrying data. A parity line 304 is provided in the bus 208 for transmitting a parity bit. In addition, a set of control lines 306, 308, 310, 312, 314, 316, 318, 320, and 322 is used to carry well known SCSI control signals BSY (busy), ACK (acknowledge), RST (reset), MSG (message), SEL (select), C/D (control/data), REQ (request), I/O (input/output), and ATN (attention), respectively. Table 1 shows these control signals and their functions.

TABLE 1

| SIGNAL | FUNCTION |
|---|---|
| BSY | Indicates whether the bus is currently busy. |
| SEL | Asserted by an initiator or target to select target or initiator, respectively. |
| C/D | Indicates whether control data is placed on the bus. |
| I/O | Indicates direction of data flow on the data bus relative to the initiator. |
| MSG | Activated by a target during a message phase. |
| REQ | Indicates data transfer handshake request by a target. |

TABLE 1-continued

| SIGNAL | FUNCTION |
|---|---|
| ACK | Indicates data transfer handshake acknowledge by an initiator. |
| ATN | Activated by an initiator to indicate an attention condition. |
| RST | Used to reset all connected SCSI devices. |

Various SCSI bus specifications are well known in the art. For example, SCSI Parallel Interface-3 (SPI-3), Revision 8, dated Jul. 28, 1999 (T10 project 1302D), which is incorporated herein by reference, is a draft specification that has been proposed for acceptance by NCITS (National Committee for Information Technology Standards).

In conventional SCSI buses, an SCSI device address is a value corresponding to one of the bit positions on the data bus. Thus, allowable device addresses on conventional SCSI buses range from 0 to 7 on an eight-bit bus and 0 through 15 on a wide (16-bit) bus. Device addresses on an SCSI bus serve to resolve collisions that occur during arbitration and to establish communications with another device during selection or reselection. During the SCSI arbitration phase, a device contends for the bus by asserting the data bit corresponding to its address. When several devices are arbitrating for the bus, relative bit positions of the contending devices are used to determine which device wins the arbitration.

Recent improvements in the SCSI electrical layer combined with low cost bus extenders and a more efficient protocol have increased the load carrying capacity of the bus far beyond the combined workload presented by the maximum number of connectable devices now allowed by the protocol. This excess load carrying capacity is foreseen to exist for some time in the future. The ability to connect more devices therefore represents an opportunity to improve systems performance at low cost by more fully utilizing latent bus capacity.

Accordingly, the present invention provides an extended capability to address an increased number of peripheral devices in additional to the legacy peripheral devices by defining an extended address space for a parallel SCSI bus. Given that an SCSI bus has an N-bit datapath corresponding to N data wires in the SCSI bus, the present invention defines the extended address space by partitioning the N data bits in the datapath into two components: a group ID field and group member ID field. Preferably, the datapath is partitioned equally so that the group ID field and the group member ID field are N/2 bits each. Thus, an address for an extended SCSI device is comprised of two bits: one bit from the group ID and one bit from the group member ID.

Figure 3B:
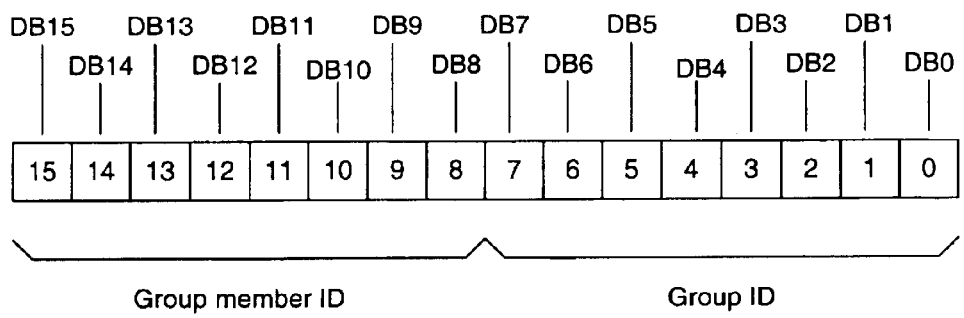
FIG. 3B shows how a 16-bit datapath of an exemplary SCSI bus is partitioned to provide extended addressing capability in accordance with one embodiment of the present invention.

FIG. 3B shows how a 16-bit datapath of an exemplary SCSI bus is partitioned to provide extended addressing capability in accordance with one embodiment of the present invention. The partitioning of the datapath involves dividing the 16 bits (i.e., bit 0 to bit 15 or DB0 to DB15) into an 8-bit group ID field and an 8-bit group member ID field. The 8-bit group ID is thus defined by the bits DB8 to DB15 while the 8-bit group member ID corresponds to the bits DB0 to DB7. This partitioning method thus allows a maximum of 64 peripheral devices to be uniquely addressed in contrast to the maximum of 16 legacy devices of the conventional SCSI bus systems. Although the present invention is illustrated by means of an SCSI bus having a 16-bit datapath, it may also be applied to any suitable peripheral buses having an N-bit datapath, where N is an integer multiple of 2.

The addressing extension is made practical by recent developments in the SCSI specification such as the well known Ultra 160m SCSI definition, which establishes a bus design based on Low Voltage Differential signaling (LVD) and a 16-bit data path. By taking advantage of the signaling capabilities of the conventional SCSI bus, the present invention allows more devices to be connected and addressed, thereby enhancing performance and simultaneously reducing cost.

The extended addressing methods of the present invention may be implemented in a variety of embodiments. In one embodiment, the selection phase of the conventional SCSI specification is modified to use encoded device identifiers in place of the bit-map approach used by legacy SCSI. In another embodiment, a bit map approach uses information obtained during arbitration to assist in the generation of the device identifiers for selected and selecting devices. The extended addressing methods implemented in these embodiments use similar arbitration and addressing schemes but may differ in the manner in which device selection is performed. In addition, the embodiments of the present invention allow extended and legacy devices to coexist in the same domain, thereby providing an intermixed operational mode.

The extended addressing methods of the present invention preserve the basic properties of the conventional SCSI addressing protocol. The mechanism for tie-breaking during arbitration results in one and only one device gaining control of the bus. During the SCSI selection (SEL) and/or reselection (RESEL) phase, the selecting device establishes communication by asserting its address plus that of the device to be selected. The selected device reads the data bus to determine the selector's identity. The selection/reselection (SEL/RESEL) handshake ensures that only one device will respond. The responding device is able to determine the address of the selecting device by reading the data bus.

As mentioned above in FIG. 3B, an extended SCSI device address for a 16-bit datapath SCSI bus is comprised of two components: a group ID (GID) corresponding to one of the lower data bits (DB7–DB0) and a group member ID (MID) from one of the upper data bits (DB 15–DB8). The address assigned to each SCSI device is a unique 2-bit combination of a group ID and a group member ID. With eight groups and eight group member IDs, therefore, up to 64 extended devices may be addressed.

An extended SCSI device of the present invention automatically operates in extended addressing mode if an extended two-bit address has been assigned to it. Otherwise, the device operates in conventional legacy mode. The group IDs and corresponding priorities are, from lowest to highest, as follows:

NULL (no bits asserted, lowest priority)
DB 0
DB 1
DB 2
DB 3
DB 4
DB 5
DB 6
DB 7 (highest priority)

The group member IDs and priorities from lowest to highest are:

DB 8 (lowest priority)
DB 9
DB 10
DB 11
DB 12
DB 13
DB 14
DB 15 (highest priority)

The SCSI arbitration and selection/reselection of the present invention employs bus control timings that specify timing values for various bus control signals. For example, the well known bus control timings readily available from SPI-3 are shown in Table 2. However, other timing schemes may also be employed without departing from the scope of the present invention.

TABLE 2

| Timing description | Timing values |
| --- | --- |
| Arbitration delay | 2.4 µs |
| Bus Clear Delay | 800 ns |
| Bus Free Delay | 800 ns |
| Bus Set Delay | 1.6 µs |
| Bus Settle Delay | 400 ns |
| QAS Arbitration Delay | 1000 ns |
| QAS Assertion Delay | 200 ns |
| QAS Release Delay | 200 ns |
| Selection Abort Time | 200 µs |
| System Deskew Delay | 45 ns |

The embodiments illustrated herein describe an initiator arbitrating for the bus to select a target in a selection phase. However, it should be noted that the target may also arbitrate for the bus to reselect an initiator in a reselection phase. The reselection operations are performed in the same manner described for the selection operations except for the state of the I/O signal. Accordingly, it should be borne in mind that the operations described for selection methods apply equally well to the reselection methods.

Figure 4A:
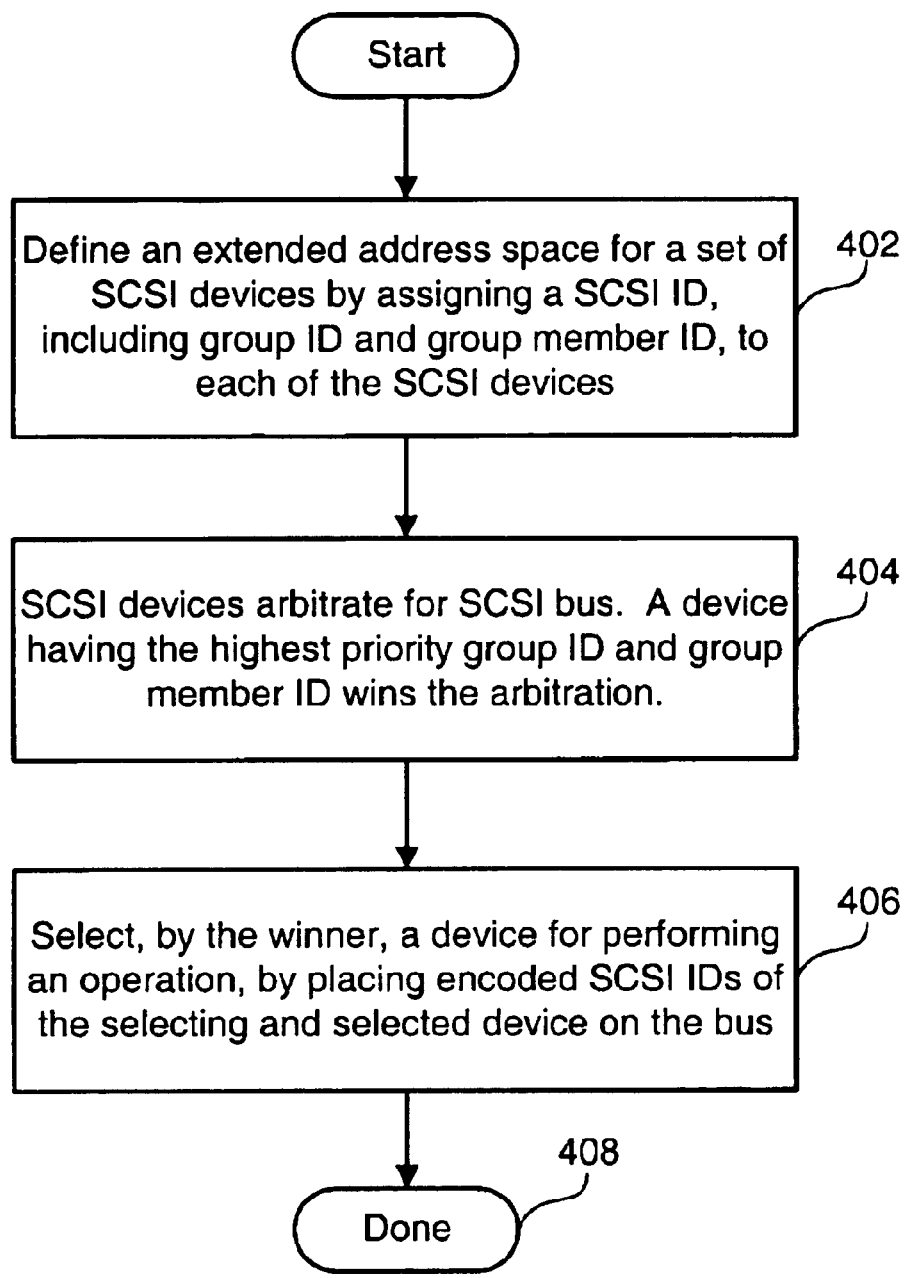
FIG. 4A illustrates a flowchart of an exemplary method for addressing extended SCSI devices in accordance with one embodiment of the present invention.

FIG. 4A illustrates a flowchart of an exemplary method for addressing extended SCSI devices in accordance with one embodiment of the present invention. In this method, an extended address space is defined, in operation 402, for a set of SCSI devices by assigning a group ID and a group member ID to each of the SCSI devices as discussed above. The assigned group ID and group member ID provides a priority that uniquely identifies the SCSI device. Then in operation 404, one or more SCSI devices arbitrate for the SCSI bus and, among these devices, an SCSI device having the highest priority group ID and group member ID wins the arbitration. Next, in operation 406, the winning device selects a device for performing an operation by placing encoded IDs of the selecting and selected devices on the bus. The connection between these devices may be terminated before the completion of the given operation. Accordingly, the method terminates in operation 408.

EXTENDED ARBITRATION

Figure 4B:
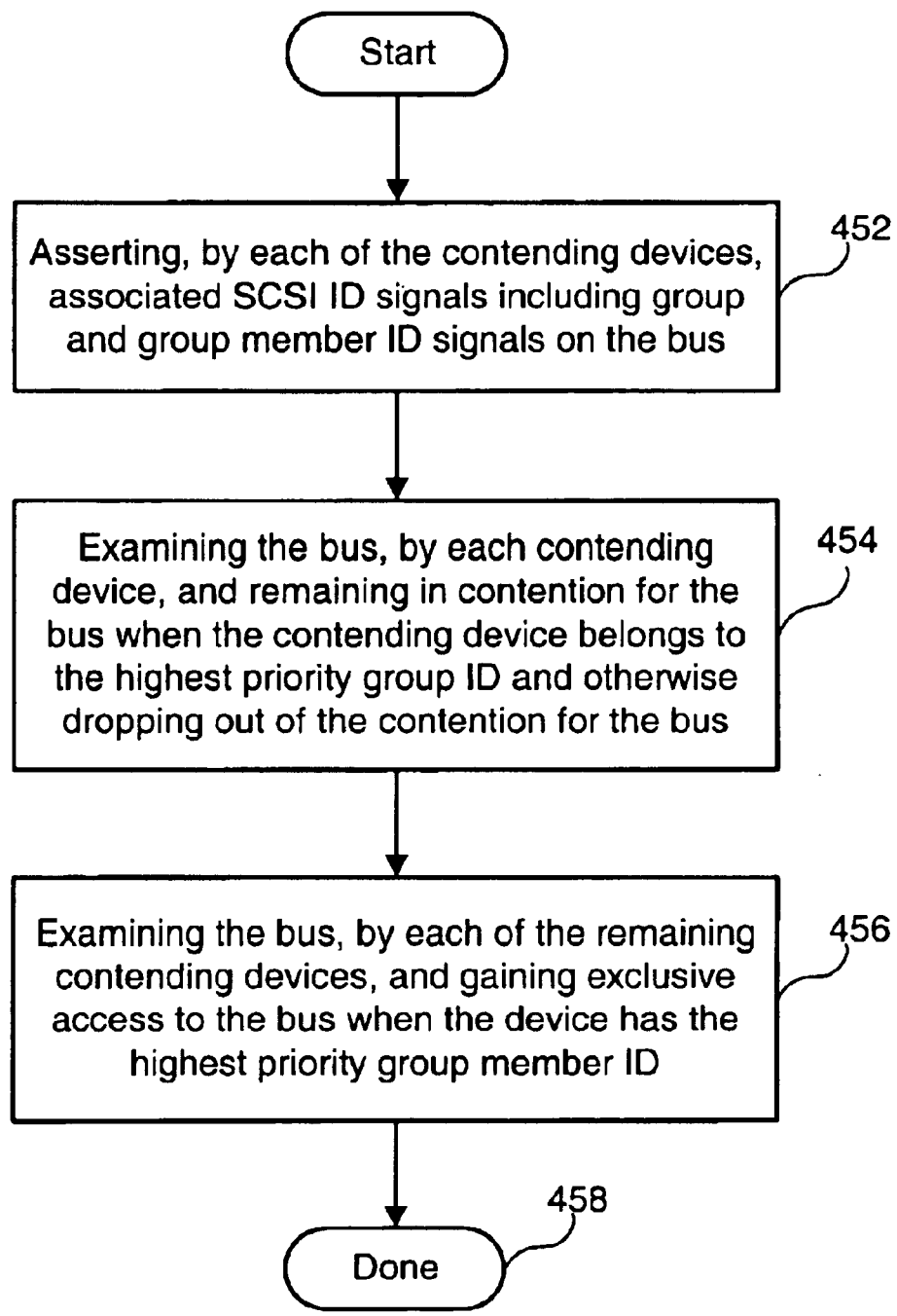
FIG. 4B shows a more detailed flowchart of a method for performing extended arbitration in accordance with one embodiment of the present invention.

In an arbitration phase, an SCSI device arbitrates for the bus so that it may act as an initiator or target for a bus operation. FIG. 4B shows a more detailed flowchart of operation 404 for performing extended arbitration in accordance with one embodiment of the present invention. The extended arbitration scheme is based on a two-cycle, hierarchical protocol for resolving contention. In the initial arbitration cycle, devices wishing to arbitrate begin arbitration, in operation 452, by asserting their group and group member IDs. Specifically, the SCSI devices wait for a BUS FREE phase to occur. The BUS FREE phase indicates that the bus is free (i.e., no device is using and controlling the bus) and is detected whenever both the BSY and SEL signals are simultaneously and continuously false for a minimum of a bus settle delay. After the detection of the BUS FREE phase (i.e. after the BSY and SEL signals are both false for a bus settle delay), the SCSI devices wait a minimum of a bus free delay before driving any signal. Following the bus free delay, an SCSI device may arbitrate for the SCSI bus by asserting the BSY signal and its own group ID for a specified amount of time. However, if more than a bus set delay has passed since the BUS FREE phase was last observed, the SCSI device will not arbitrate (i.e. assert the BSY signal and its SCSI ID).

Continuing in the initial cycle, each of the contending devices examines the bus and remains in contention, in operation 454, if it belongs to the highest priority group ID. As such, all arbitrating devices sample the data bus to determine whether or not they have lost the arbitration in accordance with the priority of their group IDs. The devices belonging to or having the highest group IDs win the initial arbitration and remain in contention while the remaining devices drop out of contention for the bus.

In accordance with one embodiment, during operation 504, devices still in contention assert SEL and BSY signals and continue to assert their SCSI IDs whereas all losing devices drop out of contention within a bus clear delay after detecting the assertion of SEL. More specifically, the SCSI devices examine the DATA BUS either when an arbitration delay has elapsed as measured from the devices' assertion of the BSY signal or when SEL signal is asserted by another device, whichever occurs first. A device loses arbitration if a higher priority group ID is present on the bus and releases the BSY signal and its SCSI ID within a bus clear delay after the SEL signal becomes true. On the other hand, all devices that have not lost arbitration during the first cycle, starts arbitration by asserting SEL signal within QA assertion delay and continue to assert BSY and the associated SCSI IDs. The assertion of the SEL signal indicates the start of the group member ID phase of arbitration and causes the losing devices to release the bus.

The second arbitration cycle begins after all losing devices have had time to clear the bus. At this point, in operation 456, the devices still in contention sample the bus once again. Among these remaining devices, a device with the highest priority group member ID wins the arbitration and asserts C/D. As in the first arbitration cycle, the remaining devices lose arbitration and drop out of contention by releasing all signals within a bus clear delay of when C/D was asserted.

In one embodiment, after waiting at least a bus clear plus twice the bus settle delay from the assertion of SEL, a device still in contention examines the DATA BUS. If no higher priority group member ID is present on the DATA BUS, then the SCSI device has won the arbitration and asserts the C/D signal. After a bus settle delay following the assertion of C/D signal, the winning device negates the C/D signal and releases C/D signal within one QAS release delay of its being negated. On the other hand, the other SCSI devices have lost the arbitration and release all signals after two deskew delays and within one QAS release delay after the C/D signal becomes true. After waiting at least a QAS release delay plus twice the bus settle delay from the assertion of C/D, the device that has won arbitration releases C/D signal. Accordingly, the SCSI device having the highest group ID and group member ID wins the arbitration for the bus in two-step arbitration process. The extended arbitration method then terminates in operation 458.

In some embodiments, the extended arbitration method may also be implemented in the quick arbitration protocol (QAS) with reduced overhead by means of a handshake defined, for example, in SPI-3, clause 10.2.2.1. The quick arbitration scheme allows a target device to transfer control of the bus to a new device without going through a bus free phase. In this method, a target signals the beginning of quick arbitration to all QAS-enabled devices using the aforementioned handshake in accordance with the QAS protocol specified in SPI-3.

When a QAS-enabled target terminates a connection with a QAS-enabled initiator, it signals the start of QAS arbitration for passing control of the bus from the target and arbitrating device. Initially, the target changes to a MESSAGE IN phase and issues a QAS REQUEST (55h) message. The target asserts REQ for a minimum of 16 nanosecond (ns) for each byte of the message(s). The current initiator asserts the ACK signal for a minimum of 16 ns in responding to each byte of the message(s). The target holds each of the message byte(s)f or a minimum of 33 ns after the detection of the ACK signal being asserted.

After the initiator negates the ACK signal for the QAS REQUEST message and if the initiator does not create an attention condition, the initiator releases all SCSI signals within two system deskew delays after detecting MSG, C/D, and I/O signals false. Upon detection of the last ACK signal being false and if there is no attention condition, the target releases all SCSI signals except the BSY, MSG, C/D, and I/O signals. At this time, the target also negates the MSG, C/D, and I/O signals within two system deskew delays. If the target detects the SEL signal being true, the target releases the MSG, C/D, and I/O signals within one QAS release delay while continuing to assert BSY. After waiting at least a QAS arbitration delay from the release of the SCSI signals, the target observes the data bus. If there are no SCSI ID bits asserted, the target transitions to the BUS FREE phase. However, if any SCSI ID bits are asserted, the target waits at least a second QAS arbitration delay. If the SEL signal is not asserted by the end of the second QAS arbitration delay, the target then transitions to the BUS FREE phase. At this point, the target waits for the C/D signal to be asserted. After detecting C/D signal assertion, the target waits for the deassertion of the C/D signal. Upon detecting the deassertion of C/D signal, the target releases the BSY signal within one QAS release delay.

The quick arbitration process is also a two-step arbitration process similar to the method described in FIGS. 4A and 4B. During the initial arbitration cycle, the SCSI device may arbitrate for the SCSI bus by asserting its own SCSI ID within a QAS assertion delay from detection of the MSG, C/D, and I/O signals being negated. The SCSI device examines the DATA BUS either when a QAS arbitration delay has elapsed as measured from the negation of the MSG, C/D, and I/O signals or when SEL is asserted by another device, whichever occurs first. If no higher priority group ID is true on the DATA BUS, then the SCSI device is still in contention and it asserts the SEL signal. If a higher priority group ID is present on the DATA BUS, then the SCSI device loses arbitration and release its SCSI IDs after two deskew delays and within one QAS release delay after detection of the SEL signal being asserted.

The assertion of SEL signal triggers the start of the second arbitration cycle and signals all devices having a lower group ID to drop out of contention. After waiting at least a QAS arbitration delay to allow losing devices to clear the bus, devices still in contention sample the DATA BUS again. If a higher priority group member ID is present on the bus, then the SCSI device has lost arbitration. If no higher priority group member ID is present on the bus, then the device wins arbitration for the bus.

The winning device asserts C/D to indicate the completion of the second arbitration cycle. After a bus settle delay following the assertion of C/D, the winning device negates the C/D signal and releases C/D within one Q/A release delay. Lower priority devices drop out of contention by releasing all signals after two deskew delays and within one QAS release delay after detecting the assertion of C/D. The winning device then negates C/D and releases all other signals. Upon detecting the C/D false transition, the target terminates QAS arbitration by deasserting BSY. The SCSI device that has won arbitration waits at least a QAS arbitration delay after asserting C/D before changing any other signals. Following the deassertion of BSY, the winning device is ready to perform extended selection or reselection as described below.

EXTENDED SELECTION/RESELECTION

In an extended selection phase, an initiator selects and establishes a connection with a target device for performing a task. During the extended selection phase, the I/O signal is false (i.e., inactive) to distinguish from an extended re-selection phase. Often, however, the connection between the initiator and the target is interrupted. To complete the task, the initiator and the target device need to re-establish communication with each other. For this purpose, an extended reselection phase is provided to complete the interrupted task. In the extended reselection phase, a previously selected target re-establishes connection with the initiator to continue an interrupted task (e.g., data transfer). The reselection protocol is similar to the above, except that the I/O signal is true (i.e., active) during the reselection phase to distinguish it from the selection phase. The following discussions are described for the selection process; however, it should be appreciated that the following discussions apply equally well for the reselection process with the exception of the I/O signal.

Figure 5A:
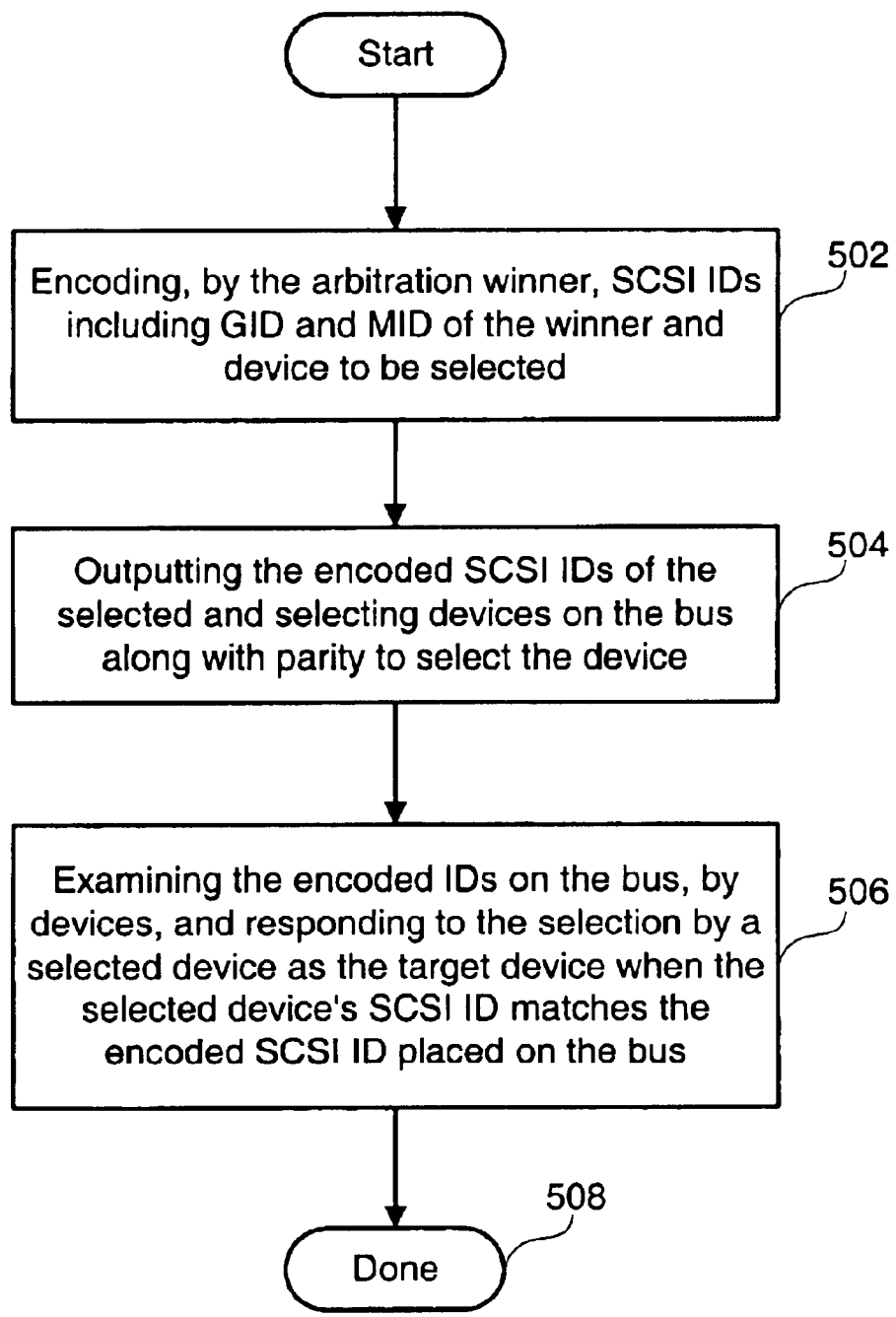
FIG. 5A shows a flowchart of a method for selecting a device by an arbitration winner in accordance with one embodiment of the present invention.

FIG. 5A shows a flowchart of an exemplary method for selecting a device by an arbitration winner in accordance with one embodiment of the present invention. In this selection method, the arbitration winner encodes, in operation 502, device bus IDs including the group ID and group member ID, of both the winner and the device to be selected. Once the bus IDs of the winning device and the device to be selected have been encoded, the encoded IDs are output on the bus to select the device in operation 504. The selected device then examines the encoded bus IDs placed on the bus and responds to the selection in operation 506 when its bus ID matches the bus ID of the device to be selected.

More specifically, when the SEL signal is true and the BSY and I/O signals are false for at least a bus settle delay, all devices examine the DATA BUS. A device d determines that it has been selected if the encoded device group ID and group member ID placed on the DATA BUS match the device's SCSI ID. The SCSI ID of the selector (i.e., initiator) is specified, for example, in data bits DB0 through DB7. Upon being selected, the selected target device asserts the BSY signal within a selection abort time of its most recent detection for proper operation of the selection time-out procedure. A device that supports extended addressing shall not respond to selection if either parity is invalid or data bits DB15, DB11, DB7 and DB3 are not all set to one. The method then terminates in operation 508.

Figure 5B:
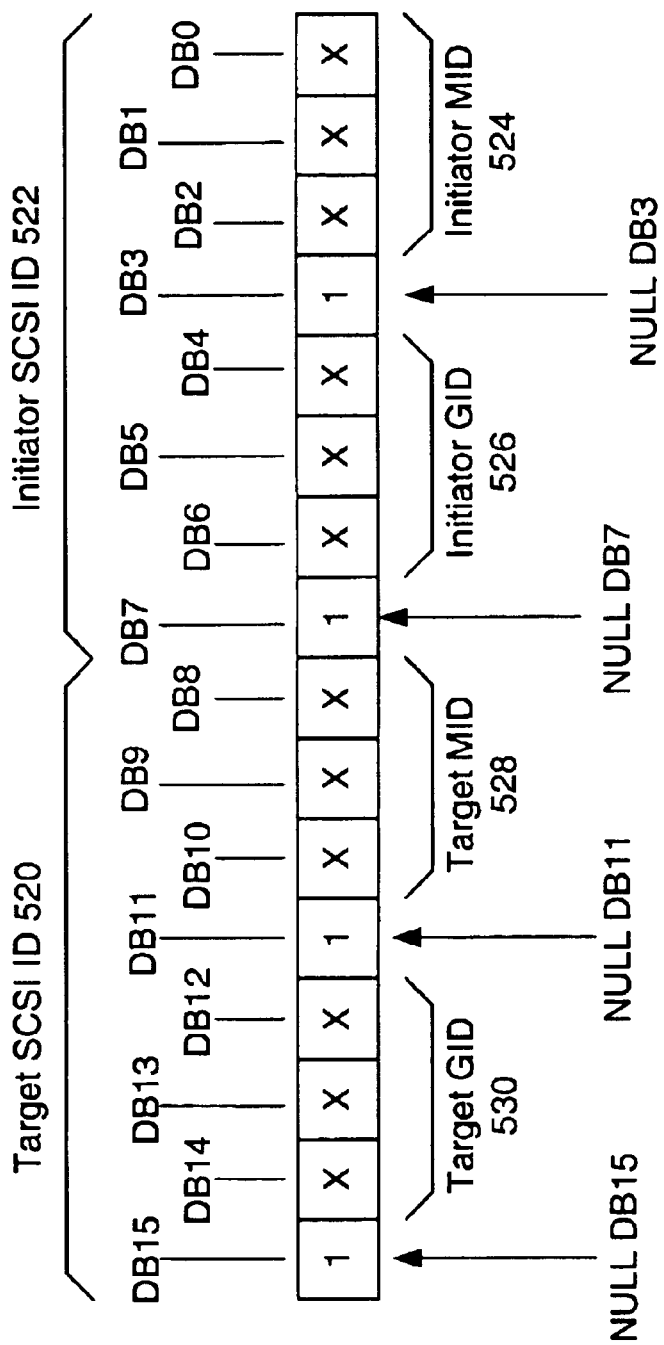
FIG. 5B illustrates an exemplary format of an encoded device selection dataword placed on a data bus in accordance with one embodiment of the present invention.

Upon completion of the extended arbitration process, the device that has won the arbitration may begin an extended selection process to select and establish communication with a target device. In one embodiment, extended selection places an encoded dataword on the data bus to identify the target and initiator. The timings for extended selection are identical to those for legacy SCSI. The format of encoded dataword placed on an exemplary 16-bit data bus is shown in FIG. 5B in accordance with one embodiment of the present invention. The dataword placed on the data bus encodes the SCSI IDs of the target (selected device) and initiator (selecting device).

Specifically, the target bus ID 520 is encoded in data bits DB8 through DB15 and the initiator ID 522 is encoded in data bits DB0 through DB7. In this configuration, a group ID (GID) or group member ID (MID) is encoded in a three-bit field in the target bus ID 520 and initiator ID 522. For example, data bits DB0 to DB2 holds an encoded initiator MID 524; data bits DB4 to DB6 contains an encoded initiator MID 526; data bits DB8 to DB10 corresponds to an encoded target MID 528; and data bits DB12 to DB15 holds an encoded GID 530. Each of the three-bit field allows encoding of up to eight GIDs or MIDs. The remaining data bits DB15, DB11, DB7, and DB3 are preferably set to one to ensure that legacy devices will not respond to an extended selection. Legacy devices are prohibited from responding to selection when more than two bits are asserted on the data bus.

In another embodiment, the extended selection of the present invention implements bus snooping during arbitration or quick arbitration. During snooping, all extended devices are required to snoop (i.e., sample, observe, etc.) the bus during each arbitration or quick arbitration cycle to determine the SCSI ID of the winning device. As will be described in more detail below, the ability to snoop the bus during arbitration is required for devices that implement the fair arbitration policy.

Figure 6A:
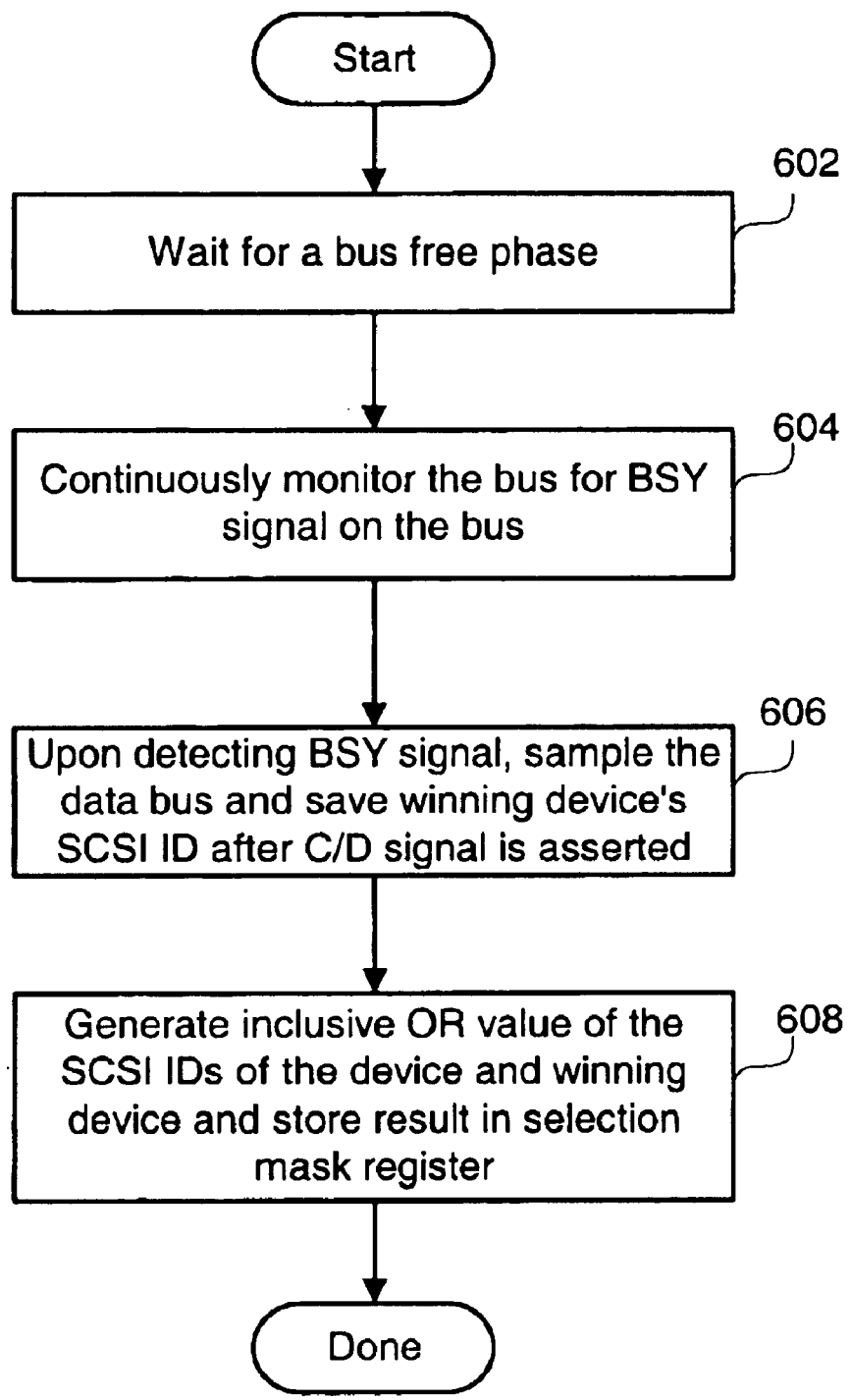
FIG. 6A shows a flowchart of a method for performing device selection by monitoring the bus activity during arbitration according to one embodiment.

FIG. 6A shows a flowchart of a method for performing device selection by monitoring the bus activity during arbitration according to one embodiment. In this method, a listening device waits for a BUS FREE phase to occur in operation 602. The BUS FREE phase is detected whenever both the BSY and SEL signals are simultaneously and continuously false for a minimum of a bus settle delay time. Upon detecting the BUS FREE condition, the listening device continuously monitors the bus for a BSY signal in operation 604. If BSY signal is asserted, the listening device begins sampling the data bus and stops after a C/D signal is asserted in operation 606. The device then saves the bus ID of the winning device. In operation 608, the device then generates an inclusive OR value of its SCSI ID and the SCSI ID of the winning device and stores the result in an internal selection mask register.

Figure 6B:
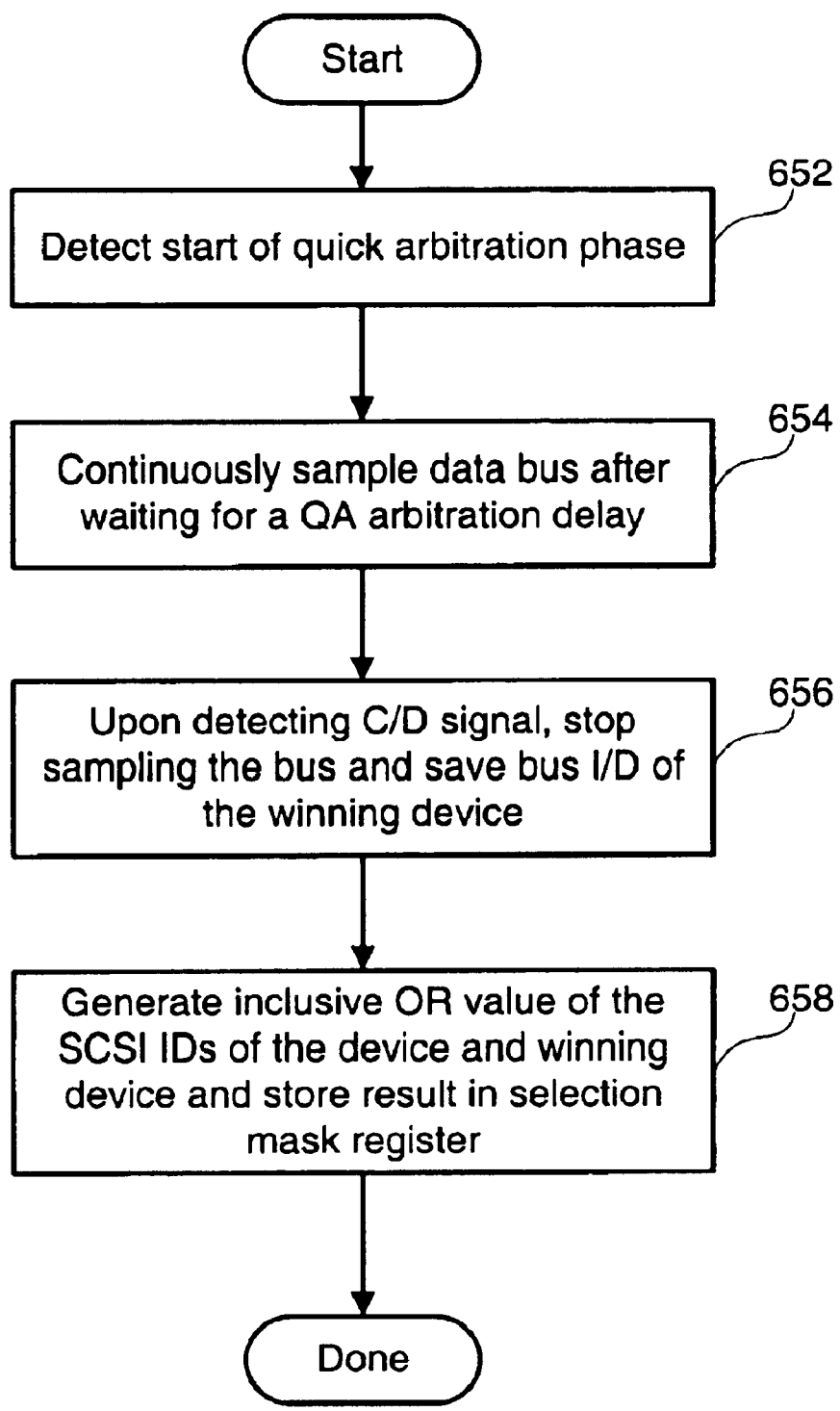
FIG. 6B shows a flowchart of a method for performing device selection by monitoring the bus during a quick arbitration process in accordance with one embodiment of the present invention.

The bus snooping may also be performed during a quick arbitration process. FIG. 6B shows a flowchart of a method for performing device selection by monitoring the bus during a quick arbitration process in accordance with one embodiment of the present invention. Initially in operation 652, a listening device detects the start of a quick arbitration as described above. After waiting for a QAS arbitration delay, the device begins sampling the data bus continuously in operation 654. When the assertion of a C/D signal is detected, the devices stops sampling the bus and saves the bus ID of the winning device in operation 656. The device then sets its selection mask register to the inclusive OR of its SCSI ID and the SCSI ID of the winning device in operation 658.

Figure 7:
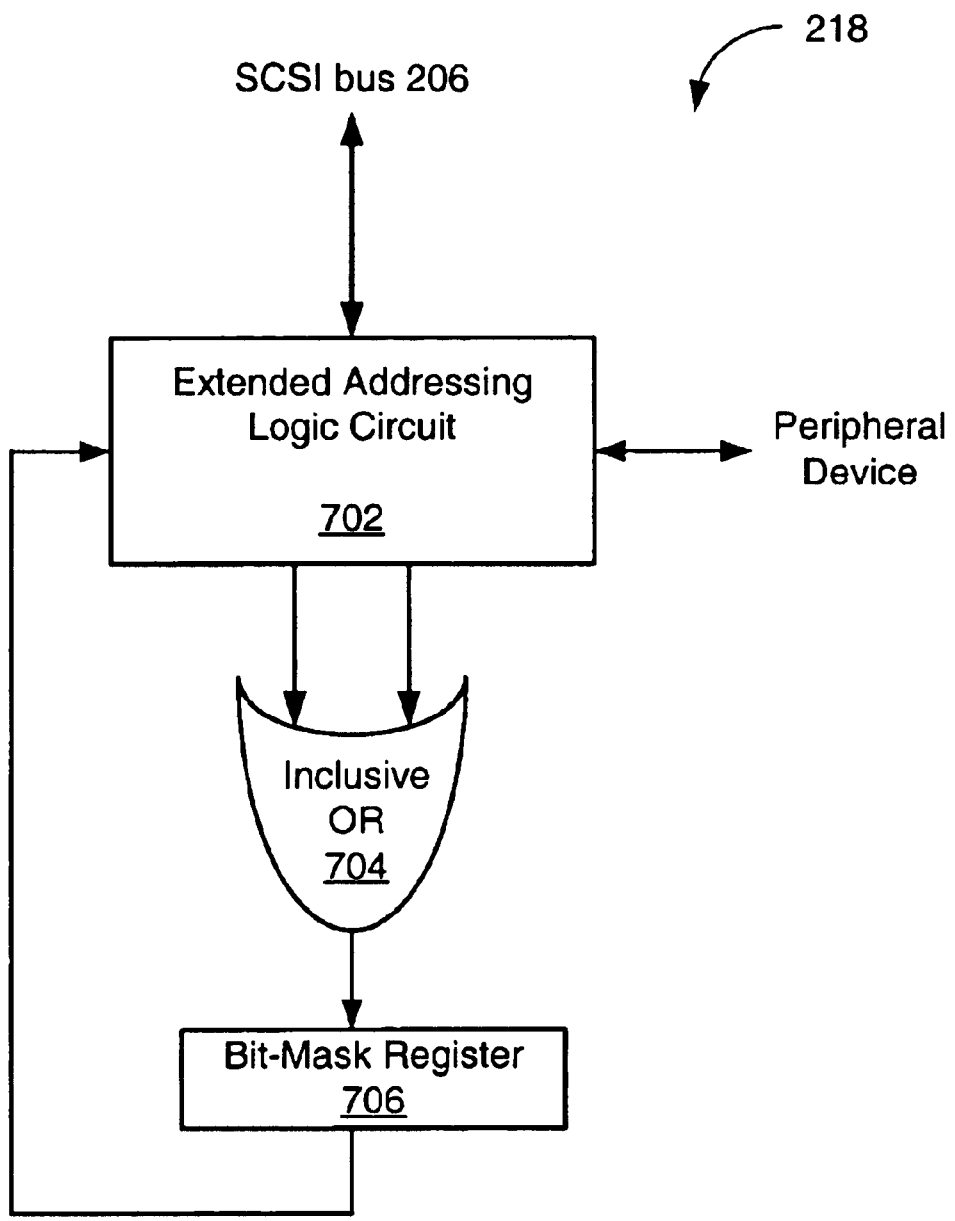
FIG. 7 shows a schematic block diagram of an exemplary circuit for generating a selection mask in accordance with one embodiment of the present invention.

Once the inclusive OR value of the SCSI IDs of the device and winning device has been stored in the selection mask register, the device accesses the content of the selection mask register during extended selection and compares it with the dataword received via the bus. FIG. 7 shows a schematic block diagram of an exemplary circuit 218 for generating a selection mask according to one embodiment. The extended addressing circuit 218 is included in a peripheral device and is shown to include an extended addressing logic circuit 702, an inclusive OR gate, and a selection mask register 706. The extended addressing logic circuit 702 is coupled to communicate with SCSI devices over the SCSI bus 206 and provides extended addressing capability to the associated peripheral device. The inclusive OR gate 704 is coupled to the extended addressing logic circuit 702 to receive the winning device's SCSI ID and the associated device's SCSI ID. The inclusive OR gate 704 performs an inclusive OR operation on these inputs to generate an inclusive OR output value. The inclusive OR output value is then saved in the selection mask register 706, which is coupled to the inclusive OR gate. The extended addressing logic circuit 702 is coupled to the selection mask register 706 to access the inclusive OR value. The logic circuit 702 determines that the associated device has been selected by referencing the inclusive OR value stored in the selection mask register 706 during the selection phase.

Figure 8:
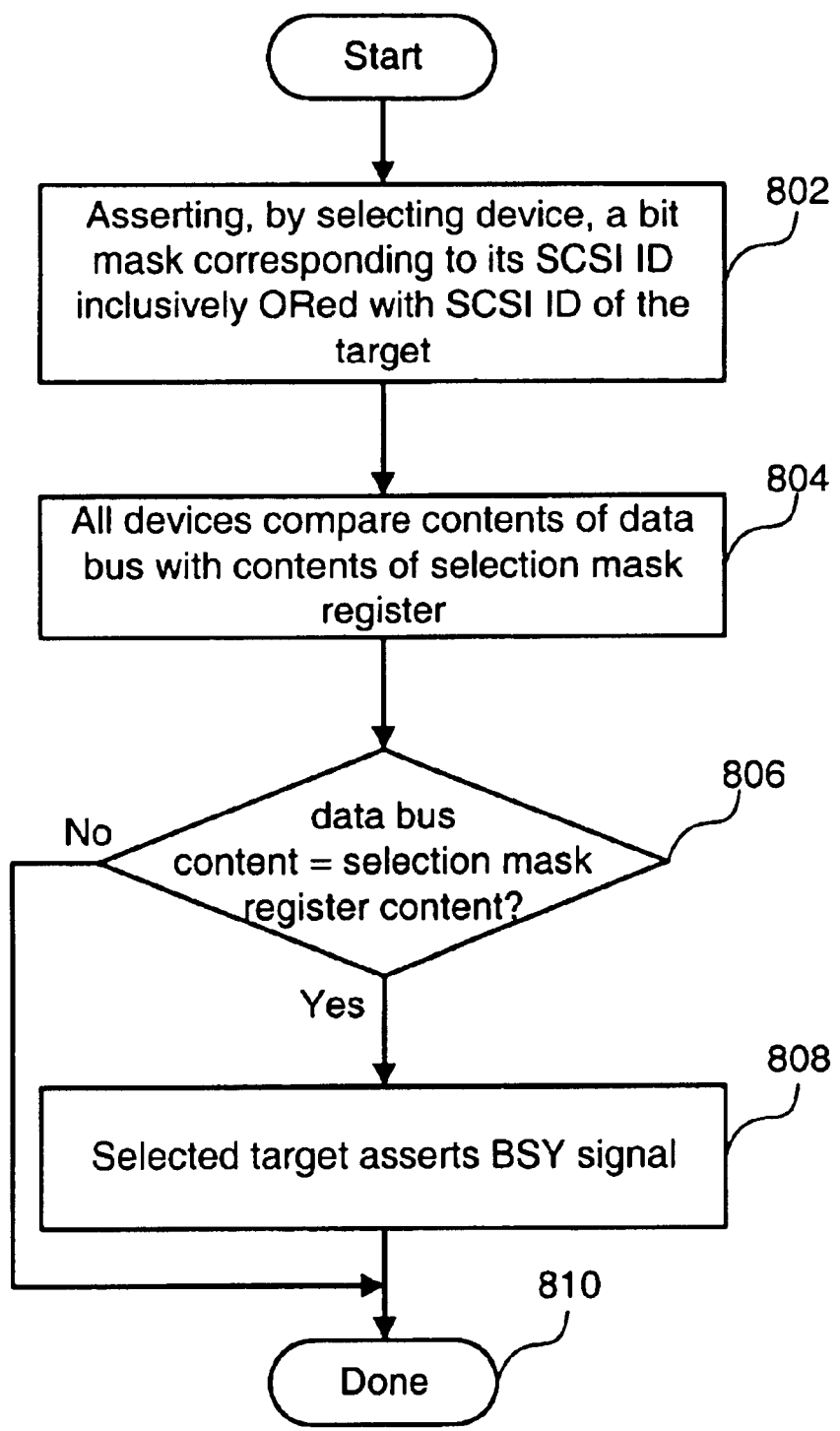
FIG. 8 shows a flowchart of a method for selecting a device in accordance with one embodiment of the present invention.

FIG. 8 shows a flowchart of a method for selecting a device in accordance with one embodiment of the present invention. In operation 802 of a selection phase, the selecting device asserts a bit mask corresponding to its SCSI ID inclusively ORed with the SCSI ID of the target. In operation 804, all devices compare the contents of the data bus with contents of the selection mask register. Then in operation 806, it is determined whether the contents of the data bus and the selection mask register are identical. If the contents are not identical, the method proceeds to operation 810. However, if the contents are identical, the method proceeds to operation 808, where the selected target asserts the BSY signal within a selection abort time of its most recent detection of being selected. This is required for proper selection time-out procedure in conformance with SPI-3 specification. The method then terminates in operation 810.

EXTENDED FAIRNESS ARBITRATION

Figure 9A:
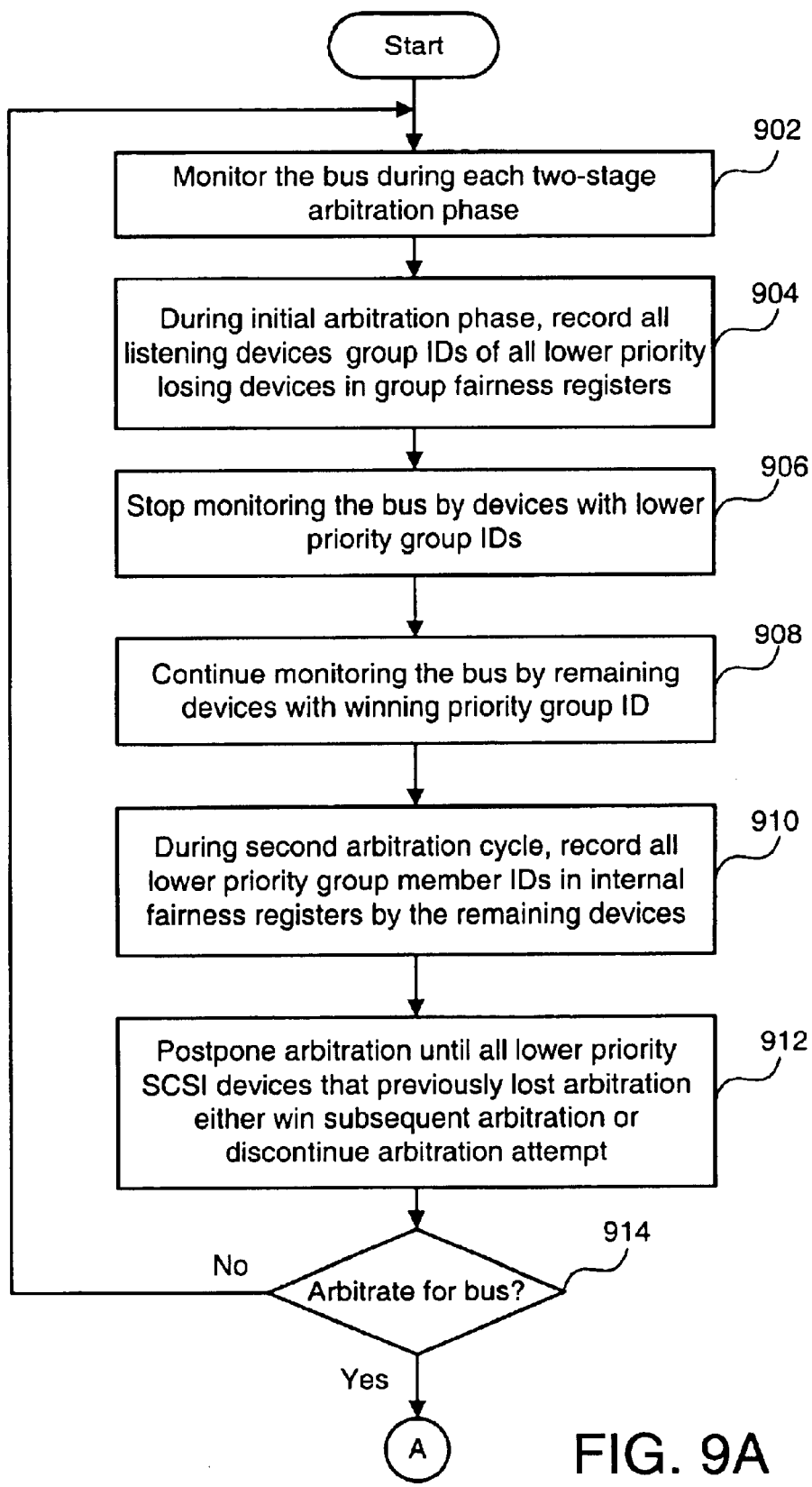
FIGS. 9A and 9B illustrate a flowchart of a method for performing extended fairness arbitration in accordance with one embodiment of the present invention.
Figure 9B:
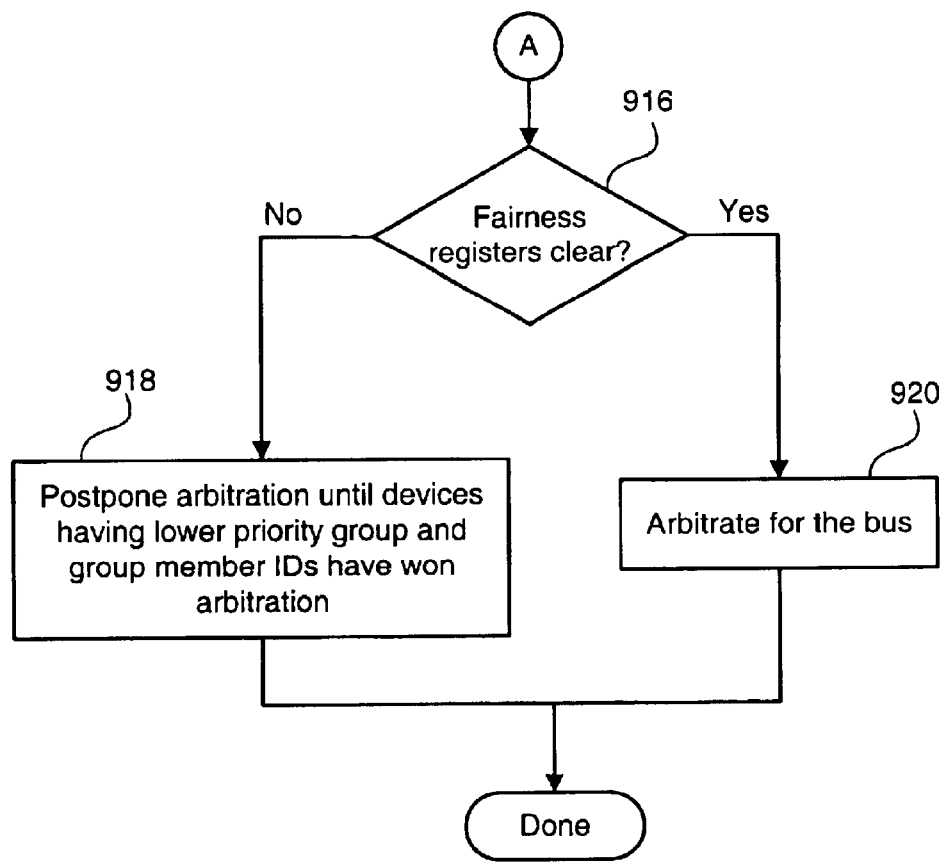

In the extended fairness arbitration of the present invention, each device supporting fair extended arbitration implements group and group member fairness registers. FIGS. 9A and 9B illustrate a flowchart of a method for performing extended fairness arbitration in accordance with one embodiment of the present invention. All devices implementing extended fairness arbitration monitor each arbitration phase in operation 902. During the first arbitration cycle, all listening devices record group IDs of all lower priority losing devices in group fairness registers in operation 904. Devices not in the winning group stop monitoring the bus in operation 906. If the device belongs to the winning group, it continues to monitor the bus in operation 908. During the second arbitration cycle, it records all lower priority group member IDs in the group member fairness register in operation 910.

In operation 912, an SCSI device that implements the extended fairness arbitration postpones arbitration for itself until all lower priority SCSI devices that previously lost arbitration either win a subsequent arbitration or discontinue their arbitration attempts (as in the case where the initiator aborted an outstanding command thus removing the need to re-arbitrate). Then in operation 914, an SCSI device determines whether to arbitrate for the bus. When it does not need to arbitrate for the SCSI bus, it monitors the arbitration attempts of the other SCSI devices and updates its fairness registers with the group and group member IDs of any lower priority SCSI devices that lost arbitration as described from operations 902 to 912.

On the other hand, if the device needs to arbitrate for the bus, the method proceeds to operation 916 of FIG. 9B. When arbitrating for the bus, the SCSI device checks to see if both of its fairness registers (i.e., group and group member fairness registers) are clear in operation 916. If so, then no lower priority SCSI devices has attempted and lost a previous arbitration. As such, the. SCSI device may now participate in arbitration in operation 920. However, if the fairness registers are not clear, the SCSI device postpones arbitration, in operation 918, until devices having lower priority group and group member IDs have won arbitration. In one embodiment, lower priority group IDs are cleared from the group fairness register as devices in those lower groups win arbitration. Similarly, lower priority group member IDs are cleared from the group member ID register as lower priority devices in that group win arbitration.

In so doing, exactly one contending device from each group is allowed to bid for the bus on each arbitration. To prevent low priority devices from holding off a high priority device indefinitely, new device bus IDs are added to the fairness registers only when the SCSI device wins or is not waiting to arbitrate. Other lower priority SCSI devices that decided to arbitrate after the waiting device will therefore not inhibit that device from attempting to arbitrate.

MIXED LEGACY AND EXTENDED DEVICE ADDRESSING MODE

The legacy and extended devices may be connected to the same bus for interoperation in accordance with one embodiment of the present invention. However, a legacy device may not utilize Quick Arbitrate and Select methods of the present invention. Further, to ensure proper operation, the legacy devices automatically drop out of contention during arbitration upon detecting SEL and BSY set at the end of the first arbitration cycle. In addition, these devices are inhibited from responding to an extended selection phase in which more than two data bits are set.

The legacy and extended devices connected to the bus operate in the mixed mode by assigning the legacy devices to the NULL group in the aforementioned exemplary addressing format of FIG. 5B. The use of the NULL group allows up to eight legacy devices and 64 extended address devices to be addressed. Each initiator has two addresses: a legacy address used for selection and reselection consisting of a single, bit significant value in the range of DB0 to DB15, and an extended address used for extended arbitration and extended selection. Device bus IDs are assigned so that at least three data bits are asserted during an extended selection or reselection and two bits are asserted when selection or reselection is performed with a legacy device. An initiator probes for legacy devices by performing a series of selections using a NULL group ID. In this case, extended address targets will not respond to selection if the number of data bits asserted is less than three or parity is incorrect. Furthermore, legacy targets will not respond to selection if more than two data bits are asserted or parity is incorrect.

During arbitration, a legacy device loses arbitration whenever there was a collision with a device having a non-NULL group ID. An initiator selects a legacy device by asserting the initiator's legacy ID along with the legacy ID of the target device. A legacy device performs reselection in a similar manner. During reselection, the assertion of only two data bits enables the initiator to detect and respond to a legacy device while at the same time inhibiting a response from an extended device. An initiator selects an extended target by asserting its group and member IDs along with those of the target device. Since at least three data bits must be asserted, a compliant legacy device will not respond.

In addition, reserved group addresses may be used to address more than eight legacy devices to be connected at the cost of a reduction in total connectivity. In this case, the legacy device count is increased by allocating some number of group IDs for use by such devices in addition to the member IDs from the NULL group specified above. However, the legacy devices may not share group IDs with devices that support extended addressing. Otherwise, device addresses are setup as described previously. As described above, devices may distinguish between legacy and extended selection and reselection by observing the number of asserted data bits. Assuming one group ID is reserved for extended address devices, such a scheme can therefore accommodate a maximum of 15 legacy devices. In this case, a total of 23 devices can be addressed: 15 legacy devices, one initiator, and seven extended targets.

Thus, methods for addressing extended peripheral devices over bus in a computer system are disclosed. The extended addressing methods of the present invention allow more than the conventional number of peripheral devices to be coupled to a computer system. The partitioning of the N-bit datapath of the bus to provide group and group member IDs allows significantly more devices to be accommodated on the bus than conventional limitation of N devices. In addition, the quick arbitration and fairness arbitration of the present invention provides attached devices with enhanced speed and ensures fairness in the arbitration process. Furthermore, the extended addressing methods of the present invention provides for addressing of legacy devices as well so that both extended devices and legacy devices may be attached to a single bus for communication.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a computer system, a method for addressing extended number of peripheral devices over a bus, said method comprising:

providing a bus having an N-bit datapath;

defining an extended address space for a set of extended peripheral devices by assigning a bus ID to each extended peripheral device, each bus ID including a group ID and a group member ID, wherein each group IDs and group member IDs also indicates a priority of said associated device and wherein each of the group IDs and group member IDs is associated with half of the N-bit datapath;

arbitrating, by one or more peripheral devices, for the bus wherein the peripheral device having the highest priority group ID and the highest priority group member ID among the arbitrating peripheral devices wins the arbitration; and selecting, by the winning device, a device by placing on the bus the bus IDs including the group IDs and the group member IDs of said selecting and selected devices, said winning device selecting said selected device for transferring data, wherein said bus is monitored during said arbitration by said one or more peripheral devices to determine the bus ID of said winning device and wherein said operation of selecting said target device comprises:

encoding, by each of said one or more peripheral devices, its bus ID and said bus IDs of said winning device into a first ID;

encoding, by said winning device, its bus ID and the bus ID of said selected device into a second ID;

asserting, by said winning device, said second ID on said bus;

examining, by each of said one more peripheral devices, said second ID; and responding to said winning device by one of said one or more peripheral devices when said first ID of said target device matches said second ID.

2. The method as recited in claim 1, wherein said first and second IDs are encoded by means of an inclusive-OR operation.

3. The method as recited in claim 1, wherein said first and second IDs are encoded into a dataword that is placed on the bus for identifying said selecting and selected devices.

4. In a computer system having a peripheral bus of N-bit datapath, a method for addressing more than N peripheral devices that are coupled to the computer system via said bus, the method comprising:

a) defining an extended address space for (N/2)-by-(N/2) peripheral devices by assigning a bus ID to each peripheral device, each bus ID being associated with a first ID and a second ID, wherein each of said first and second IDs indicate a priority of said associated device;

b) arbitrating, by one or more peripheral devices, for the bus wherein a peripheral device having a highest priority first ID and a highest priority second ID wins the arbitration;

c) selecting, by the winning device, a target device by placing on the bus the bus IDs including the first IDs and the second IDs of said winning and target devices, said winning device selecting said target device for transferring data; and d) repeating operations b) and c) when said data transfer has not been completed, wherein said target device arbitrates for said bus and reselects said winning device for completing said data transfer.

5. The method as recited in claim 4, wherein said bus has N lines corresponding to said N-bit datapath, wherein said bus ID includes at least a pair of bits corresponding to a pair of lines in said bus, one bit for a group ID and one bit for a group member ID.

6. The method as recited in claim 5, wherein said N-bit datapath of said bus is partitioned into a pair of fields comprising said first ID and second ID.

7. The method as recited in claim 6, wherein said highest priority first ID is the highest first ID and said highest priority second ID is the highest second ID.

8. The method as recited in claim 4, wherein N is an integer multiple of 2.

9. The method as recited in claim 4, wherein said operation of arbitrating for said bus further comprises:

arbitrating, by said one or more peripheral devices, for said bus such that said peripheral devices having the highest priority first ID remain in contention for the bus while other peripheral devices drop out of contention for said bus; and arbitrating, by said remaining peripheral devices having the highest priority first ID, for said bus such that said peripheral device having the highest priority second ID wins the arbitration.

10. The method as recited in claim 9, wherein each of said one or more peripheral devices arbitrates for said bus by asserting its associated bus ID signals including its first and second IDs on said bus.

11. The method as recited in claim 9, wherein said operation of arbitrating for said bus by said one or more peripheral devices comprises:

detecting a bus free phase on said bus;

asserting, by each of said peripheral devices, on said bus its associated bus ID signals including its first and second IDs; and monitoring said bus, by said one or more peripheral devices, to determine which of said one or more peripheral devices has the highest priority first ID, wherein said peripheral devices having the highest priority first ID remains in contention for said bus and said other peripheral devices drop out of contention.

12. The method as recited in claim 11, wherein said peripheral devices having the highest priority first ID assert SEL and BSY signals while continuing to assert associated bus IDs and wherein said other peripheral devices drop out of contention within a bus clear delay after detecting the assertion of said SEL signal.

13. The method as recited in claim 9, wherein said operation of arbitrating for said bus by said remaining peripheral devices comprises:

monitoring said bus by said remaining peripheral devices to determine which of said remaining peripheral device has the highest priority second ID;

asserting, by said peripheral device having the highest priority second ID, a C/D signal; and dropping out of contention, by other remaining peripheral devices, by ceasing to drive all signals within a bus clear delay of the assertion of said C/D signal.

14. The method as recited in claim 4, wherein said one or more peripheral devices arbitrate for said bus in accordance with a quick arbitration protocol.

15. The method as recited in claim 4, wherein said bus is monitored during said arbitration by said one or more peripheral devices to determine the bus ID of said winning device and wherein said operation of selecting said target device comprises:

encoding, by each of said one more peripheral devices, its bus ID and said bus IDs of said winning device into a first encoded ID;

encoding, by said winning device, its bus ID and the bus ID of said target device into a second encoded ID;

asserting, by said winning device, said second encoded ID on said bus; and examining, by each of said one more peripheral devices, said second encoded ID; and responding to said winning device by one of said one or more peripheral devices as said target device when said first encoded ID of said target device matches said second encoded ID.

16. The method as recited in claim 15, wherein said first and second encoded IDs are encoded by means of an inclusive-OR operation.

17. The method as recited in claim 15, wherein said first and second encoded IDs are encoded into a dataword that is placed on the bus for identifying said winning device and said target device.

18. The method as recited in claim 4, wherein each of said one or more peripheral devices postpones arbitration until all lower priority peripheral devices that previously lost arbitration either win a subsequent arbitration or discontinue its arbitration attempt.

19. The method as recited in claim 4, wherein one or more legacy peripheral devices are addressed in addition to said extended devices by providing one or more null group bits in said extended address space, wherein bus IDs are assigned so that at least three data bits are asserted when selecting an extended peripheral device and two bits are asserted when selecting a legacy device.

20. The method as recited in claim 4, wherein said bus is an SCSI bus and said peripheral devices are SCSI devices.

* * * * *